3,483,255
PROCESS FOR THE PREPARATION OF AROMATIC N-ALKYLAMINES
Francesco Minisci, Milan, Remo Galli, Torricella Del Pizzo, Cremona, and Adolfo Quilico, Milan, Italy, assignors to Montecatini Edison S.p.A., Milan, Italy
No Drawing. Filed Oct. 24, 1966, Ser. No. 588,757
Claims priority, application Italy, Oct. 29, 1965, 24,142/65; July 5, 1966, 15,554/66; Sept. 2, 1966, 20,173/66
Int. Cl. C07c 87/66, 87/62
U.S. Cl. 260—576    8 Claims

ABSTRACT OF THE DISCLOSURE

Alkylarylamines obtained by alkylaminating substituted or unsubstituted arene at from about −20 to +100° C. in reaction medium containing strong acid, and in the presence of cuprous, ferrous or titanous reducing salt.

---

The present invention relates to a process for the alkylamination of aromatic compounds in order to obtain monoalkylaryl-amines and dialkyl-aryl-amines.

We have now surprisingly found that it is possible to alkylaminate aromatic compounds by reacting them with an alkylchloroamine in the presence of a reducing salt (ferrous, cuprous or titanous salt) in a reaction medium containing a strong acid. The starting aromatic compound can be an unsubstituted arene such as benzene, toluene, naphthalene or substituted arene having various substituents such as chlorine, bromine, iodide, —OCH$_3$, —NHCOCH$_3$, NO$_2$, —NO, OR, —COOR wherein R is H or an alkyl group having up to 5 carbon atoms, etc. The aromatic compound may also contain a heterocyclic nucleous such as quinoline, but must contain at least one aromatic ring.

The unsubstituted arenes used in the present invention contain from 6 to 12 carbon atoms, the substituted arenes from 6 to 18 carbon atoms. In order to obtain the dialkylaryl-amines, dialkyl-N-chloro-amines wherein the alkyl group contains from 2 to 12 carbon atoms are used. The alkyl groups may also be joined to form a heterocyclic compound such as N-chloro-piperidine. To obtain the monoalkyl-aryl-amines, monoalkyl-N-chloroamines, wherein the alkyl group contains from 1 to 6 carbon atoms, are used. Due to the lower stability of the primary monoalkyl-chloroamines, these are preferably used in form of salts (e.g., sulfates or trifluoroacetates).

The reducing salt is a cuprous (Cu$^+$), ferrous (Fe$^{++}$) or titanous (Ti$^{+++}$) salt, preferably of an inorganic acid. Ferrous and titanous salts particularly sulfates and chloride, which give better yields, are preferred. The reducing salt forms a redox system with the chloroamine.

The reaction medium contains a strong organic or inorganic acid, having a pKa<2. Suitable reaction mediums include, for instance, a mixture of a strong mineral acid, such as sulfuric acid, and an organic acid, such as acetic acid, or a mixture of concentrated sulfuric acid and methanol, or a strong organic acid such as trifluoroacetic acid, the latter being easily recovered at the end of the reaction by distillation and recycled. When using a mixture of sulfuric and acetic acid it is essential, in order to obtain good yields, that the two acids be present in critical ratios the acetic acid being present from 0 to 50% (preferably weight ratios of sulfuric acid to acetic acid of between about 2 and 4).

The yields are increased by using a molar ratio of arene to chloroamine higher than 1; the excess of arene is, however, limited by ts solubility in the reaction mixture. At the end of the reaction the excess arene can be easily separated from the raw product and recycled. On the other hand, when the aromatic compound is more expensive than the amine, an excess of chloroamine is used. The amount of reducing salt is important for good reaction rates. The amount of the ferrous, cuprous, or titanous salt is 0.01 to 1 mole preferably between about 0.4 and 0.8 mol for each mol of N-chloroamine.

The process of the present invention is advantageous in that convenient and economical reaction conditions may be employed. Thus, the reaction is carried out at low temperatures, generally from 0° to 50° C., preferably at room temperature, without heating or cooling of the reaction mixture. Rather, the temperature is adjusted by controlling the rate at which the reducing salt is added. In the case of the dialkyl-N-chloroamines it is preferable to start the reaction at a temperature between −20 and +100° C., while for the monoalkyl-chloroamines, which are less stable, it is preferable to start the reaction at temperatures between −20 and +40° C. Another important feature of the process is the remarkably short time (20–60 minutes) within which the reaction is completed.

At the end of the reaction, the crude is diluted with water and the excess aromatic compound is separated. The reaction product is then treated with an alkali to produce the free alkyl-aryl-amine which is then extracted with a suitable solvent.

The following examples are given to further illustrate the present invention without limiting its scope.

Example 1

20 g. of solid ferrous sulfate heptahydrate were added, under good agitation, to a mixture, kept at 16° C., of 42 cc. of acetic acid, 70 cc. of concentrated sulfuric acid, 30 cc. of benzene and 12 g. of N-chlorodimethylamine sulfate. The temperature rose spontaneously to 36° C. within 15 minutes. The reaction mixture was kept under agitation for an additional 20 minutes and then diluted with water. The excess benzene was separated and the acid aqueous solution then made alkaline with 30% NaOH. The alkaline solution was extracted with ether and the ether extract distilled. 9.8 g. of N,N-dimethylaniline were obtained, corresponding to a yield of 86%.

Example 2

11 g. of solid ferrous sulfate heptahydrate were added, under good agitation, to a mixture, kept at 20° C., of 30 cc. of acetic acid, 60 cc. of concentrated sulfuric acid, 20 cc. of benzene and 6 g. of N-chloropiperidine. The reaction mixture was kept under agitation for 35 minutes and then diluted with water. The excess benzene was separated and the aqueous mixture then made alkaline with a 30% sodium hydroxide solution. 5.9 g. of N-phenylpiperidine were extracted with ether, corresponding to a yield of 71%.

Example 3

14 g. of ferrous sulfate heptahydrate were added under agitation to a mixture, kept at 25° C., of 40 cc. of acetic acid, 73 cc. of concentrated sulfuric acid, 30 cc. of toluene and 12 g. of N-chloro-dimethylamine. The temperature rose spontaneously to 45° C. within 5 minutes. The reaction mixture was kept under agitation for an additional 25 minutes and then diluted with water. The excess toluene was decanted and the aqueous solution then made alkaline as described in the previous examples. 8.6 g. of N,N-dimethyltoluidine (10% ortho, 51% meta and 39% para) were extracted with ether.

Example 4

14 g. of ferrous sulfate heptahydrate were added under agitation to a mixture of 70 cc. of trifluoroacetic acid, 30 g. of naphthalene and 12 g. of N-chlorodimethylamine sulfate. The temperature rose spontaneously from 20 to 45° C. within 5 minutes. The reaction mixture was kept under agitation for an additional 30 minutes and then trifluoroacetic acid was distilled off and the residue diluted with water. The excess naphthalene was separated and the aqueous solution then made alkaline and extracted with ether. 6.9 g. of N,N-dimethylnaphthylamine (97% alpha, 3% beta) were thus obtained.

Example 5

4 g. of cuprous oxide were added under agitation to a mixture, kept at 20° C. of 40 cc. of acetic acid, 70 cc. of concentrated sulfuric acid, 30 cc. of benzene and 6 g. of N-chloropiperidine. The mixture was agitated for 50 minutes, then diluted with water and the excess of benzene separated. 4.3 g. of N-phenylpiperidine were obtained from the resulting acid solution by adding alkali and extracting with ether as described in the previous examples.

Example 6

7 g. of solid titanium trichloride were added under agitation to a mixture of 40 cc. of acetic acid, 73 cc. of concentrated sulfuric acid, 30 cc. of benzene and 5.8 g. of N-chlorodimethylamine. The temperature rose spontaneously from 15° to 29° C. within 10 minutes. The reaction mixture was agitated for an additional 30 minutes and then diluted with water. The excess benzene was separated and the aqueous solution was then made alkaline and extracted with ether. 7 g. of N,N-dimethylaniline were obtained, corresponding to a yield of 80%.

Example 7

To 20 g. of diphenyl and 7.9 g. of dimethyl-N-chloroamine in 60 cc. of sulfuric acid and 30 cc. of acetic acid were added, under agitation, 10 g. of finely powdered ferrous sulfate heptahydrate. The temperature rose from 8° to 34° C. The reaction mixture was diluted with water and the unreacted diphenyl (13.8 g.) filtered off. By treating the solution with sodium hydroxide and then extracting with ether, 6.8 g. of 4,4'-N-tetramethyl-diaminodiphenyl and 1.6 g. of 4-N-dimethyl-amino-diphenyl were obtained.

Example 8

12 g. of N-chloropiperidine in 50 cc. of concentrated sulfuric acid were added dropwise to 30 cc. of anisole and 28 g. of ferrous sulfate heptahydrate in 150 cc. of methanol, so as to maintain the temperature between 30 and 35° C. At the end of the addition, the reaction mixture was diluted with water and the excess anisole separated. Then the solution was made alkaline and then 6.5 g. of piperidine-anisole were extracted with ether (9% ortho and 91% para).

Example 9

To 8.5 g. of 8-methoxy-quinoline and 5.6 g. of dimethylchloroamine in 110 cc. of 85% sulfuric acid were added, under agitation, 10 g. of pulverized ferrous sulfate heptahydrate. The temperature rose in 10 minutes from 15 to 28° C. After 25 minutes the reaction mixture was diluted with water, made alkaline with sodium hydroxide and extracted with ether. 9.6 g. of 5-dimethyl-amino-8-methoxyquinoline,

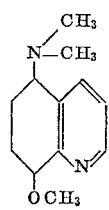

were obtained.

Example 10

To 10.7 g. of benzylamine and 8.4 g. of N-chloropiperidine in 90 cc. of 90% sulfuric acid were added, under agitation, 10 g. of ferrous sulfate heptahydrate. The temperature rose spontaneously in 15 minutes from 8 to 30° C. By working as in the previous examples described, 6.6 g. of unreacted benzylamine and 6.1 g. of piperidinobenzylamine (essentially the meta isomer),

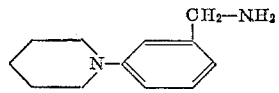

were obtained.

Example 11

To 20 g. of chlorobenzene and 8 g. of dimethyl-chloroamine in 80 cc. of concentrated sulfuric acid were added, under agitation, 15 g. of ferrous sulfate heptahydrate. The temperature rose spontaneously in 15 mintes from 15 to 30° C. By operating as described in Example 9, 6.5 g. of chloro-N,N-dimethyl-aniline (72% para, 22% ortho and 6% meta) were obtained along with 14 g. of unreacted chlorobenzene.

Example 12

To 17 g. of bromo-naphthalene and 8 g. of dimethyl-chloroamine in 64 cc. of concentrated sulfuric acid and 20 cc. of acetic acid were added, under agitation and cooling (at 0–10° C.), 7 g. of ferrous sulfate heptahydrate. By proceeding in the manner described above, 19.2 g. of a basic product, containing 92.6% of 5-bromo-1-dimethyl-amino-naphthalene, were obtained.

Example 13

To 17 g. of 1-nitro-naphthalene and 8 g. of dimethylchloroamine in 64 cc. of sulfuric acid and 20 cc. of acetic acid were added, under agitation between 10 and 32° C., 15 g. of ferrous sulfate heptahydrate. By proceeding in the manner described above, 12.3 g. of unreacted 1-nitro-naphthalene and 4.6 g. of (75%) 5-nitro-1-dimethylamino-naphthalene and (25%) 1-nitro-8-dimethylamino-naphthalene were obtained.

Example 14

10 g. of finely pulverized ferrous sulfate heptahydrate were added in small amounts, at −2° C. and under agitation, to a mixture of 12 g. of N-chloro-methylamine, 70 cc. of concentrated sulfuric acid, 10 cc. of acetic acid and 20 cc. of benzene. The temperature rose to 38° C. within 10 minutes and an abundant development of hydrochloric acid occurred. The reaction mixture was agitated for an additional 40 minutes and then diluted with water. The excess benzene was decanted off and the solution made alkaline with caustic soda and extracted with ether. After evaporation of the solvent, 9.4 g. of N-methylaniline were recovered by distillation at 195–196° C.

Example 15

Starting with 11 g. of N-chloroethylamine and otherwise proceeding as described in Example 14, 7.7 g. of N-ethylaniline, having a boiling point of 205° C., were obtained.

Example 16

Starting with 11 g. of N-chloro-n-butylamine and otherwise proceeding as described in Example 14, 4 g. of N-butylaniline, having a boiling point of 95–96° C./3 torr, were obtained.

Example 17

9 g. of N-chloro-methylamine were dissolved in 50 cc. of concentrated sulfuric acid. Then 10 cc. of acetic acid and 20 cc. of benzene were added, whereupon 1.3 g. of finely pulverized titanium trichloride were introduced under strong agitation. The temperature rose in 10 minutes from 0° to 39° C. The reaction mixture was agitated for 30 minutes and diluted with water. The unreacted excess benzene was recovered and 7.8 g. of N-methylaniline separated by use of alkali followed by extraction.

Example 18

To 10 g. of N-chloro-methylamine, 20 cc. of toluene in 60 cc. of concentrated sulfuric acid and 10 cc. of acetic acid were added, under agitation, 10 g. of pulverized ferrous sulfate heptahydrate. The temperature initially at −2° C., was controlled by means of external cooling with water and rose to 20° C. The reaction mixture was agitated for 50 minutes and diluted with water. The unreacted toluene was recovered and 6 g. of N-methyltoluidine (27.5% ortho, 25% meta, 47.5% para) was recovered in the usual manner.

Example 19

To 9 g. of N-chloro-methylamine, 20 cc. of p-xylene, 50 cc. of concentrated sulfuric acid and 10 cc. of acetic acid, were added, under agitation, 10 g. of pulverized ferrous sulfate heptahydrate. The temperature rose from −5° to 25° C. After 50 minutes the mixture was diluted with water, unreacted p-xylene decanted and 5.7 g. of 2,5-dimethyl-N-methylaniline, having a boiling point of 73–74° C./0.5 torr, recovered in the usual manner.

Various changes and modifications can, of course, be made without departing from the spirit and scope of the invention.

Having thus described our invention, what we desire to secure by Letters Patent and hereby claim is:

1. A process for alkylaminating an arene containing from about 6 to 18 carbon atoms to obtain an alkylarylamine, which process comprises reacting said aromatic compound with an N-chloro-alkylamine at a temperature of from about −20 to +100° C., in a reaction medium containing a strong acid having a pKa <2, in the presence of a cuprous, ferrous or titanous reducing salt.

2. The process of claim 1 wherein said alkylarylamine is a monoalkyl-arylamine and said N-chloro-alkylamine is a monoalkylchloroamine containing from 1 to 6 carbon atoms.

3. The process of claim 1 wherein said alkylarylamine is a dialkylarylamine and said N-chloro-alkylamine is a dialkylchloroamine containing from 2 to 12 carbon atoms.

4. The process of claim 1 wherein said reducing salt is selected from the group consisting of ferrous sulfate heptahydrate, titanium trichloride and cuprous oxide.

5. The process of claim 1 wherein said strong acid is selected from the group consisting of sulfuric acid and trifluoroacetic acid.

6. The process of claim 1 wherein from about 0.4 to 0.8 mol of reducing salt are present for each mol of chloroamine.

7. The process of claim 1 wherein the reaction is carried out at a temperature of from about −10° C. to +50° C.

8. The process of claim 1 wherein the reaction is carried out at about room temperature.

References Cited

"Handbook of Chemistry and Physics," 44th ed. (1962), pp. 800, 804, and 1258. P. A. S. Smith, "Open Chain Nitrogen Compounds," vol. 1, W. A. Benjamin, Inc., N.Y. (1965), p. 119.

CHARLES B. PARKER, Primary Examiner

RICHARD L. RAYMOND, Assistant Examiner

U.S. Cl. X.R.

260—289, 293, 394.7, 471, 518, 562, 577